United States Patent
Limaye

[19]

[11] Patent Number: 5,997,744
[45] Date of Patent: Dec. 7, 1999

[54] FLUID SEPARATION MODULE HAVING A POROUS MONOLITHIC CORE

[76] Inventor: Santosh Y. Limaye, 3009 E. Alvera Cir., Salt Lake City, Utah 84117

[21] Appl. No.: 08/991,752

[22] Filed: Dec. 16, 1997

[51] Int. Cl.$^6$ .............................. B01D 61/14; B01D 61/18
[52] U.S. Cl. ........................ 210/650; 210/433.1; 210/490; 210/510.1; 210/651; 55/523
[58] Field of Search ..................................... 210/650, 651, 210/433.1, 435, 483, 490, 506, 510.1; 55/523

[56] References Cited

U.S. PATENT DOCUMENTS

| | | |
|---|---|---|
| 3,977,967 | 8/1976 | Trulson et al. . |
| 4,069,157 | 1/1978 | Hoover et al. . |
| 4,253,962 | 3/1981 | Thompson . |
| 4,290,263 | 9/1981 | Mann et al. ............................. 55/484 |
| 4,364,761 | 12/1982 | Berg et al. ........................... 210/510.1 |
| 4,390,355 | 6/1983 | Hammond, Jr. et al. ............ 210/510.1 |
| 4,695,301 | 9/1987 | Okajima et al. ..................... 210/510.1 |
| 4,781,831 | 11/1988 | Goldsmith . |
| 5,006,248 | 4/1991 | Anderson et al. . |
| 5,030,351 | 7/1991 | Burggraaf et al. . |
| 5,104,539 | 4/1992 | Anderson et al. . |
| 5,114,581 | 5/1992 | Goldsmith et al. ....................... 55/523 |
| 5,174,896 | 12/1992 | Harms, II . |
| 5,208,190 | 5/1993 | Anderson et al. . |
| 5,227,342 | 7/1993 | Anderson et al. . |
| 5,256,299 | 10/1993 | Wang et al. . |
| 5,268,101 | 12/1993 | Anderson et al. . |
| 5,269,926 | 12/1993 | Webster et al. . |
| 5,384,044 | 1/1995 | Burgess . |
| 5,518,624 | 5/1996 | Filson et al. . |
| 5,552,351 | 9/1996 | Anderson et al. . |
| 5,645,727 | 7/1997 | Bhave et al. . |
| 5,716,559 | 2/1998 | Larsen et al. ............................ 55/523 |
| 5,770,326 | 6/1998 | Limaye .................................. 429/30 |

*Primary Examiner*—John Kim
*Attorney, Agent, or Firm*—Joy L. Bryant

[57] ABSTRACT

A fluid separation module is provided. The module comprises a monolithic core having a first set of passages extending from a feed end to a retentate end. The first set of passages has a specific cross-sectional area. A second set of passages are positioned in a non-parallel relationship to the first set of passages for passage of a permeate. Additionally, the fluid separation module has at least one transducer affixed to the monolithic core. The fluid separation module of the present invention may be used for macrofiltration, microfiltration, ultrafiltration, nanofiltration, and reverse osmosis.

39 Claims, 7 Drawing Sheets

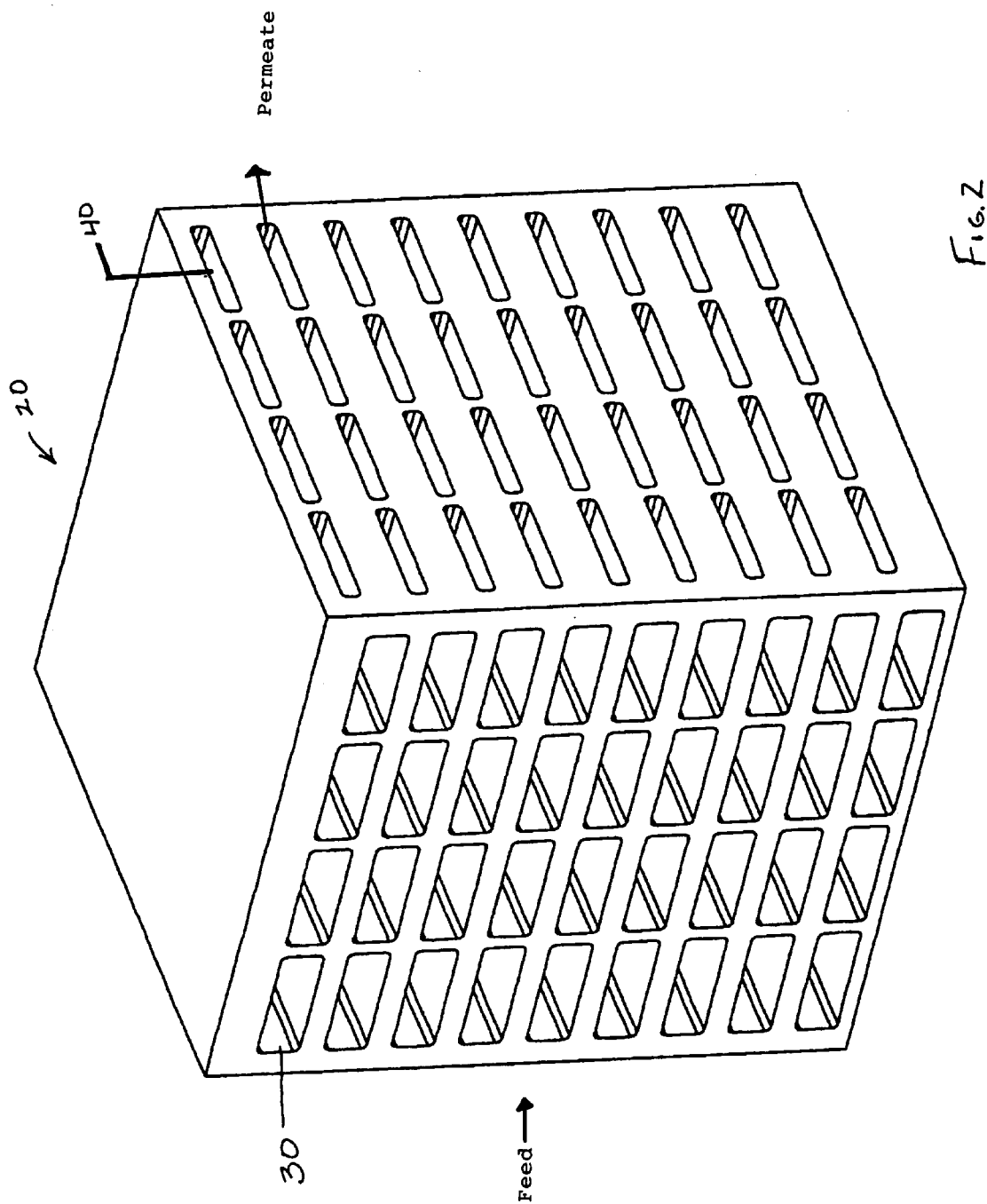

FLUID SEPARATION MODULE HAVING A POROUS MONOLITHIC CORE

FIELD OF THE INVENTION

The present invention relates to fluid separation. In particular, it relates to a fluid separation module having a monolithic core.

BACKGROUND OF THE INVENTION

Filtration devices have been used in the past for the separation of components of a fluid based on the size, shape or physical character of the components and by employing hydraulic pressure. One component of the fluid (permeate or filtrate) is selectively forced through a membrane to separate that component from the remainder of the mixture. In straight-through filtration, the fluid is passed through a filter and suspended matter remains on the filter surface or within the filter matrix allowing only the filtrate to pass through. Cross-flow filtration allows for tangential flow across the filter surface to sweep away suspended matter which is unable to pass through the filter surface pores.

Ultrafiltration is typically carried out using a cross-flow filtration technique which involves a porous substrate. During cross-flow filtration, the feed flows parallel to the membrane and the permeate flows perpendicular to the membrane. One way in which this is achieved is by using a porous ceramic tube which is multi-channeled and has a high surface area for filtration. Such devices usually employ filtrate conduits to carry the filtrate to a filtrate collection zone. However, many of these configurations are bulky, and often require extensive and complicated piping arrangements.

Hoover et al. (U.S. Pat. No. 4,069,157) provided a ceramic support having a multiplicity of parallel passageways therethrough. The passageways were coated with an ultrafiltration membrane. The support had a specific surface area to volume ratio of about from 300 to 2000 m$^2$/m$^3$(3 to 20 cm$^2$/cm$^3$) and a defined permeability factor which is greater than about $1.0 \times 10^{-4}$ m. The general configuration of the support element is an elongated form having a constant cross-sectional shape along its length.

The passageways can be of any shape convenient for the methods of preparation and membrane insertion and the channels generally have a total cross-sectional area which comprises from about 40 to 75% of the total cross-sectional area of the element. This system requires that pressure be controlled according to the discharge of the concentrated feed stock through a valve, the flow of fresh feed stock through a pump and the flux of filtrate from an element.

Goldsmith (U.S. Pat. No. 4,781,831) disclosed a cross-flow filtration device which includes a structure of porous material which defines a plurality of passage-ways extending longitudinally from the feed end of the structure to the retentate end. A number of filtrate conduits are within the structure for carrying the filtrate from within the structure toward a filtrate collection zone. The filtrate conduits provide paths of lower flow resistance than that of alternative flow paths through the porous material. The structure is constructed such that the filtrate conduits are distributed among the passageways to provide low pressure drop flow paths for the filtrate flow from the passageways through the porous material to nearby filtrate conduits.

Thompson (U.S. Pat. No. 4,253,962) discloses a non-destructive ultrasonic vibratory system for removing the fouling layer which forms on the filter surface and reduces the filtering efficiency with use. Also disclosed is the introduction of a frequency sweep to avoid formation of sustained standing waves which are deleterious to the filter membrane.

An object of the present invention is to provide a fluid separation module which acts as a cross-flow filter capable of extracting the retentate from one portion of the module and continuously extracting the permeate (filtrate) from another portion of the module.

Another object of the present invention is to provide a fluid separation module which has a high volume specific surface area ranging from about 2 to 20 cm$^2$/cm$^3$.

Another object of the present invention is to provide a fluid separation module which optimizes the transmembrane pressure such that it is uniform from the feed inlet to the retentate outlet.

Another object of the present invention is to provide a fluid separation module which is easy to fabricate and low in manufacturing cost.

Another object of the present invention is to provide a process for fluid separation which utilizes the fluid separation module.

Another object of the present invention is to provide a process which uses ultrasonic vibration to remove fouling of the passages.

SUMMARY OF THE INVENTION

By the present invention, a fluid separation module is provided. The module comprises a monolithic core having a first set of passages extending from a feed end to a retentate end. The first set of passages has a specific cross-sectional area. A second set of passages are positioned in a non-parallel relationship to the first set of passages for passage of a permeate. Additionally, a transducer is affixed to the monolithic core to allow for vibration while the fluid separation module is in use to prevent blockage of the first set of passages.

This design allows the separation module to act as a cross-flow filter which is capable of extracting the retentate from one portion of the device and continuously extract the filtrate from another portion. Such a design is low in cost to manufacture and has a high volume specific surface area ranging from about 2 to 20 cm$^2$/cm$^3$.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which:

FIG. 2 is a perspective view of a preferred embodiment of the fluid separation module.

DETAILED DESCRIPTION OF THE PREFERRED EMBODIMENTS

The present invention will be more fully understood by reference to the figures, in which like elements are represented by the same numbers. The fluid separation module of the present invention may be used for macrofiltration, microfiltration, ultrafiltration, nanofiltration, and reverse osmosis. The fluids to be separated by the fluid separation module may be any combination of a fluid and an impurity and in particular: oil and water; water and waste products; water and detergents; blood and nutrients; toxic and nontoxic materials; oil and gas; corrosive and noncorrosive materials; as well as those impurities found in the food, textile and paper making industries. The compact size of the module and its ability to separate such a variety of fluids, makes the module very adaptable for use in solving various environmental problems, particularly those encountered in disaster areas.

Figure 1:
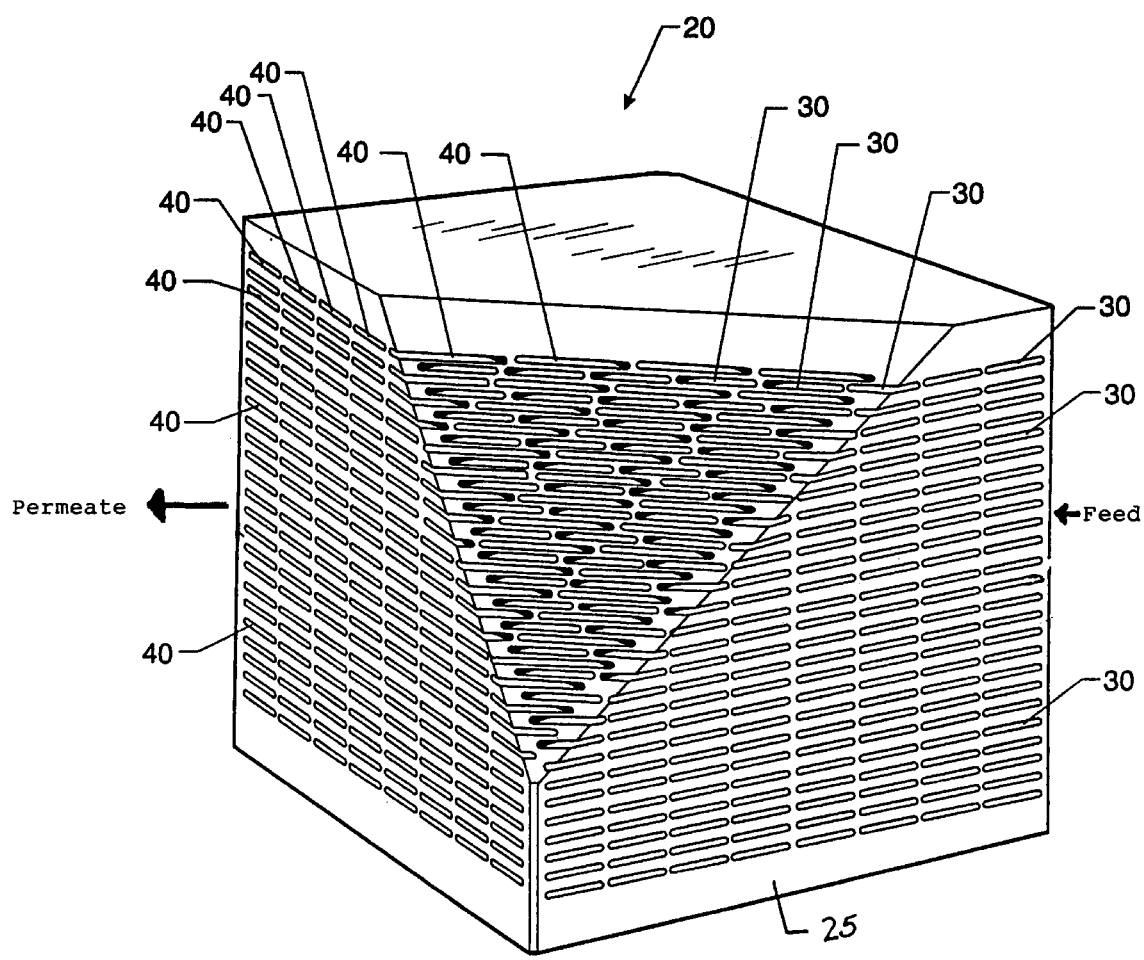
FIG. 1 is a perspective view with a cut-away section of the fluid separation module.

Referring now to FIG. 1, which shows one embodiment of the fluid separation module 20 of the present invention. The module 20 comprises a monolithic core 25 having two sets of passages. A first set of passages 30 extends from a feed end to a retentate end (not shown) and is positioned in a non-parallel relationship to a second set of passages 40. The first set of passages 30 allows for passage of a feed stream and retentate whereas the second set of passages 40 allows for passage of a permeate. For the purpose of this specification and the appended claims, a non-parallel relationship is defined as orthogonal, hexagonal, or radial. More specifically, the non-parallel relationship is orthogonal. The monolithic core is generally comprised of any porous material and in particular, may be ceramic, polymeric, paper or metal. When paper is used, the paper is generally filter paper and has a porosity which does not allow for passage of material having a specific particle size or greater. The paper filter is generally folded to the desirable configuration and stacked appropriately. Most preferably, the material is a porous material having a pore size ranging from about 20 nanometers to about 40 microns and is typically a ceramic. Typical ceramics used for this device include but are not limited to: cordierite, alumina, mullite, silica, zirconia, titania, spinel, silicon carbide, or mixtures thereof. The core is fabricated using conventional fabrication techniques such as injection molding, gel casting, or molding where both sets of passages are formed at the same time. Each set of passages forms an array which extends three-dimensionally across and down through the monolithic core. The monolithic core is any geometric shape and in particular is either a cube, a modified cube, or a cylinder. By modified cube it is meant that the shape is not a true cube shape but instead is orthorhombic.

Figure 5:
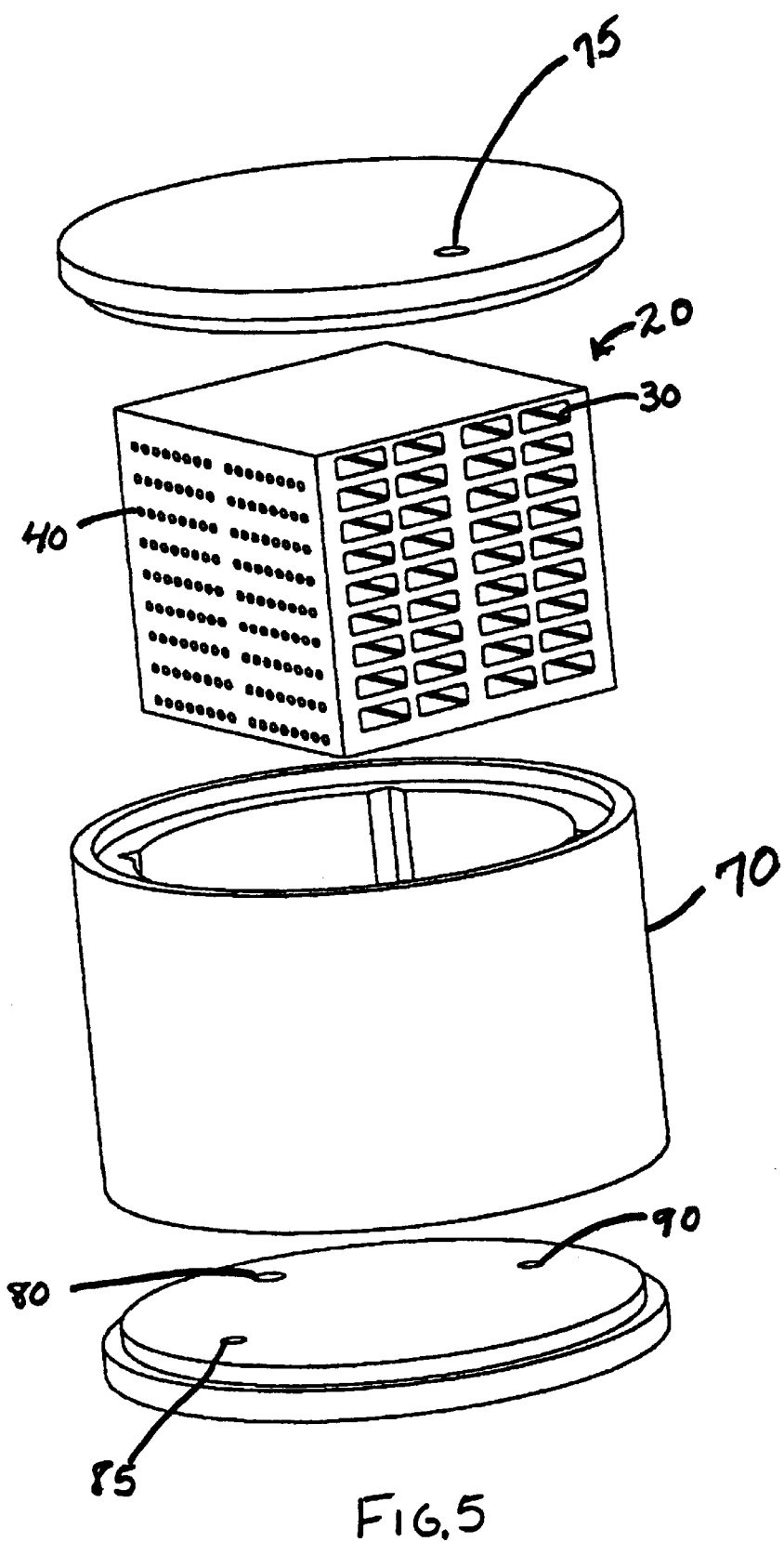
FIG. 5 is an exploded view of the fluid separation module having a housing.

FIG. 2 shows a preferred embodiment wherein the first set of passages 30 are tapered from the feed end to the retentate end and the second set of passages 40 have a smaller cross-sectional area than the first set of passages 30. Although preferred, a smaller cross-sectional area is not required. Since the amount of permeate is less than the amount of feed, larger passages are not needed. The tapering of the first set of passages is such that the cross-sectional area of the passage decreases from the feed end to the retentate end. This taper makes it possible to maintain the pressure drop as the fluid passes from the feed end to the retentate end. There is no need to taper the second set of passages because no pressure drop occurs. It is desirable to optimize the transmembrane pressure throughout the core thus utilizing a minimal amount of pressure to obtain maximum separation. The transmembrane pressure ($\Delta P_T$) is calculated as:

$$\Delta P_T = ((P1+P2) - P3)$$

where:

P1=pressure of the feed flow
P2=pressure of the retentate
P3=pressure of the permeate The geometric shape of the passages may be any shape known to those skilled in the art and is preferably, oval, round, or a polygon having at least three sides. Such a polygon is either a triangle, a rectangle, a square, or a parallelogram. Most preferably, the passages are rectangular. In addition, the first set of passages may have a different shape than the second set of passages. This is shown in FIG. 5, where the shape of the first set of passages 30 is rectangular and the shape of the second set of passages 40 is round.

Figure 3A:
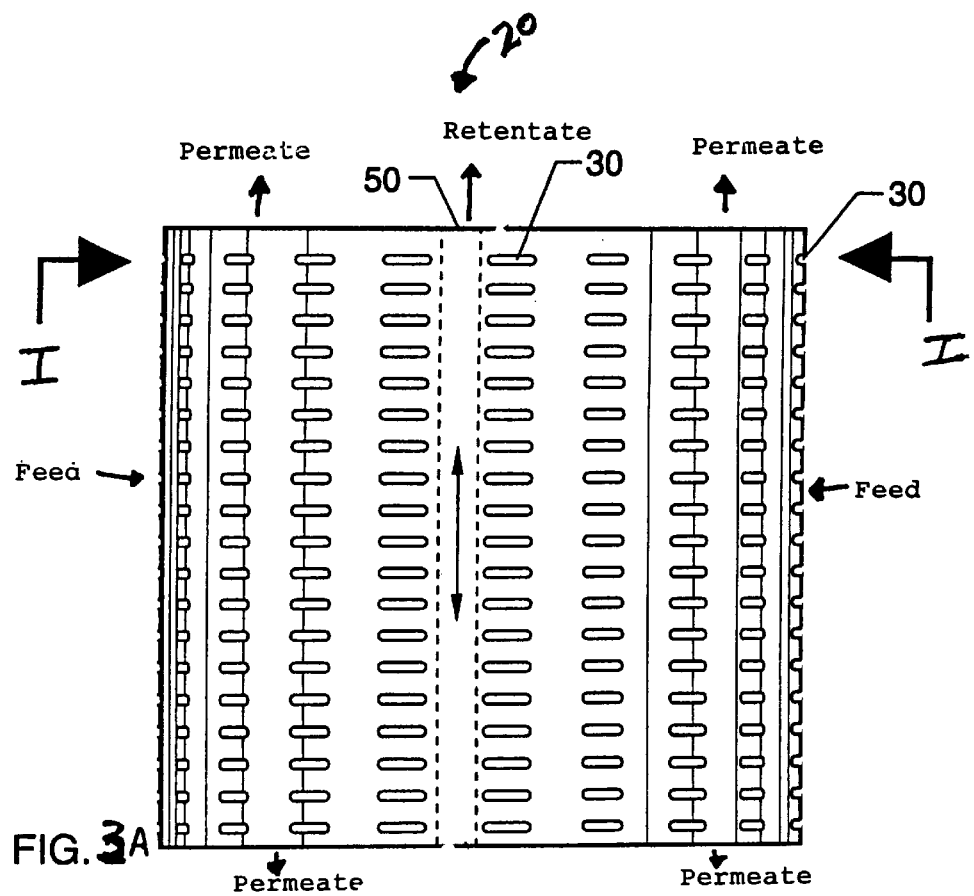
FIG. 3A is a perspective view of an alternative embodiment of the fluid separation module.
Figure 3B:
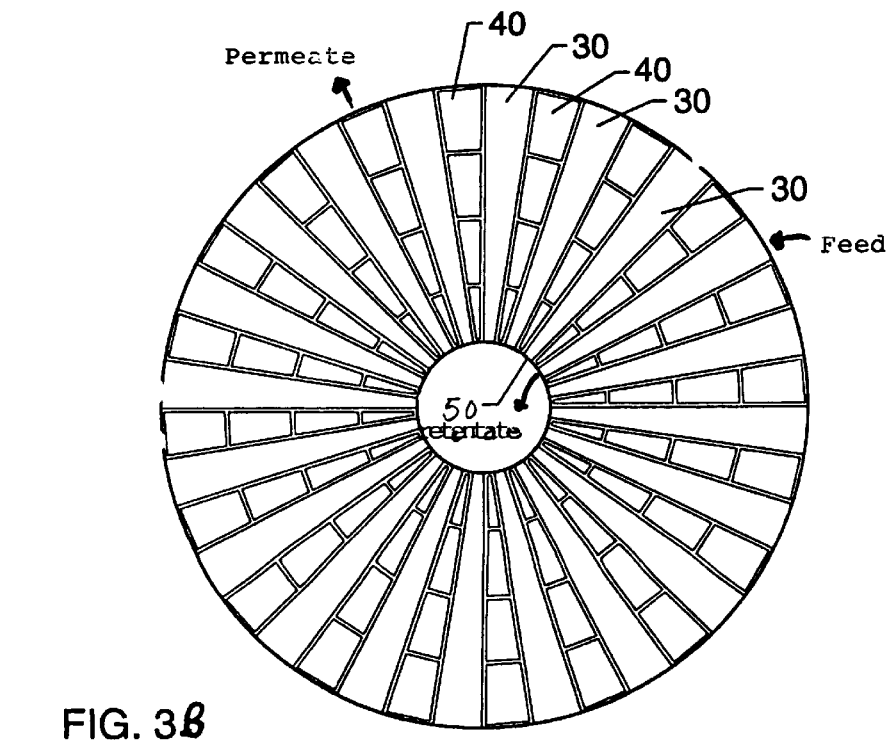
FIG. 3B is a cut-away view along line I—I of FIG. 3A.

FIGS. 3A and 3B show another embodiment wherein the fluid separation module 20 is cylindrical shaped. In this configuration there is a hollow core 50 which runs down through the center of the cylinder. The feed flow is introduced through the exterior surface of the cylinder into the first set of passages 30 and the retentate flows out of the first set of passages 30 into the hollow core 50. The permeate passes through the porous material into the second set of passages 40 where it is recovered through the ends of the second set of passages at either end of the cylinder.

Figure 4:
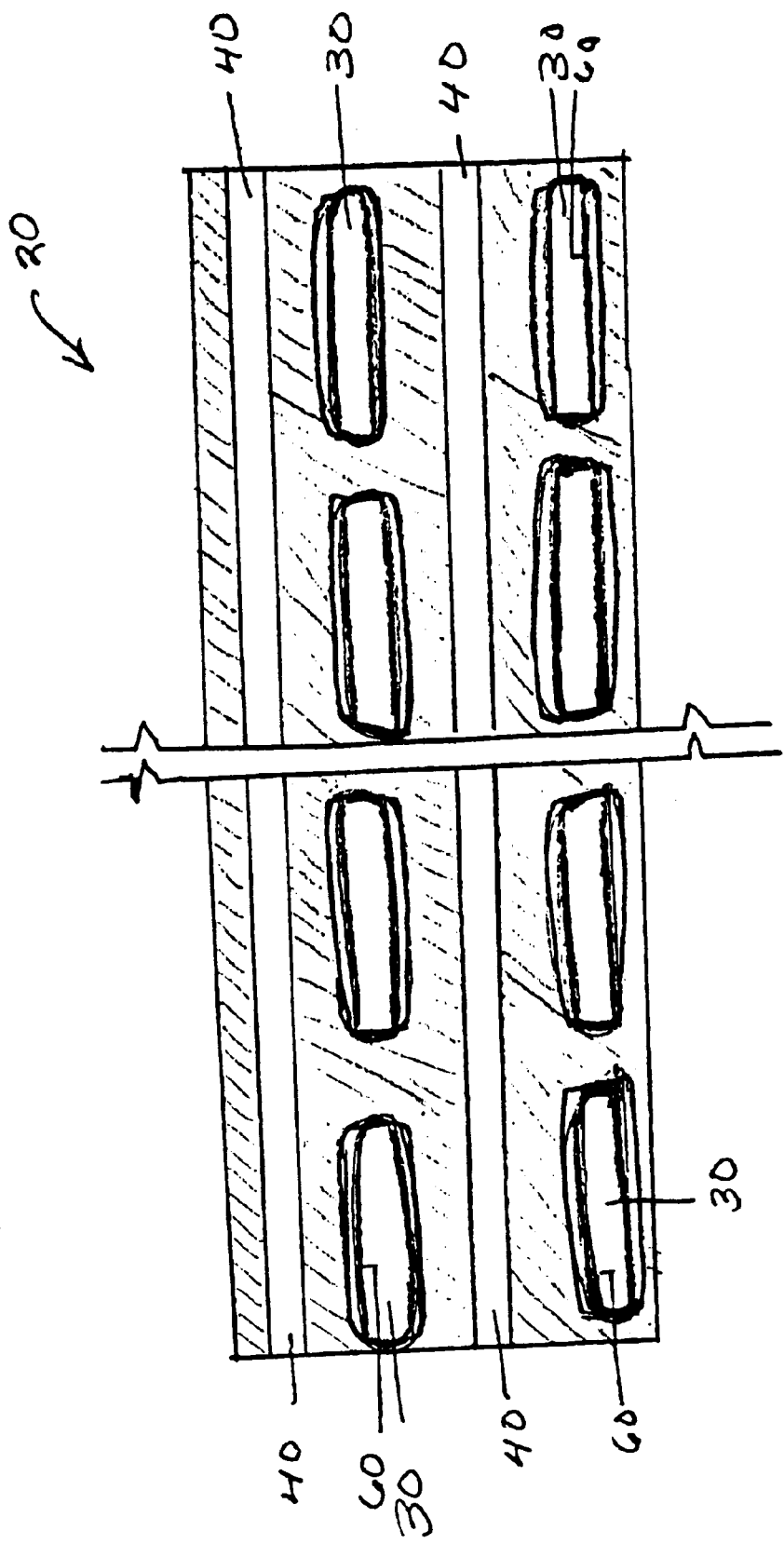
FIG. 4 is a sectional view of the fluid separation module having tapered passages and a porous filtration membrane.

FIG. 4 shows another embodiment of the fluid separation module 20 wherein a porous filtration membrane 60 is disposed within the first set of passages 30. For macrofiltration, no filtration membrane is required. However for those applications where particles less than 0.1 micron need to be removed, a filtration membrane is required. Any filtration membrane known to those skilled in the art may be used. In particular the membranes include organic films as well as membranes formed from solid particles. These particles include inorganic materials such as alumina, silica, zirconia, titania, needle-like potassium titanate and carbon particles of suitable dimension. Examples of these membranes their preparation and application are shown in 5,030, 351; 5,269,926; 5,268,101; 5,227,342; 5,208,190; 5,104, 539; and 5,006,248 all of which are hereby incorporated by reference.

Preferably the fluid separation module comprises a porous ceramic monolithic core having a cube shape. A first set of rectangular, tapered passages extends from a feed end to a retentate end. The first set of passages has a filtration membrane disposed therein and a cross-sectional area. A second set of rectangular passages are positioned in an orthogonal relationship to the first set of passages, for passage of a permeate, such that the second set of passages has a smaller cross-sectional area than the cross-sectional area of the first set of passages.

When in use, a fluid separation module comprising a monolithic core having a first set of passages extending from a feed end to a retentate end and a second set of passages, for passage of a permeate, positioned in a non-parallel relationship to the first set of passages is provided. FIG. 5 shows an exploded view of the fluid separation module 20 in relationship to a housing 70 having a feed inlet 75, a retentate outlet 80, and two permeate outlets 85,90. A feed stream is introduced under pressure into the feed inlet 75. Since the fluid separation module 20 is cube shaped and the housing 70 is cylindrical shaped, an annular area is formed between the face of the fluid separation module and the housing. The feed stream enters the annular area where the entrance to the first set of passages 30 is larger in cross-sectional area than the exit end (not shown) or tapers from top to bottom from the entrance end to the exit end. As the annular area fills with fluid, the pressure from the fluid causes the fluid to enter into the first set of passages 30. The feed stream passes through the first set of passages 30 where it is separated into a permeate and a retentate as it comes in contact with the walls of the first set of passages 30. Depending on the size of particles to be separated, the first set of passages 30 may be coated with a filtration membrane. The larger particles remain in the first set of passages 30 and the permeate passes into the second set of passages 40. The permeate passes through the second set of passages 40 and exits the second set of passages 40 where it passes into the annular area formed between the faces of the second set of passages 40 and the housing 70. The permeate is then recovered through the permeate outlets 85,90. The pressure applied to the feed stream coupled with the tapered passages allows the large particles to be cleared or removed from the surface of the filtration membrane, if applied, or the surface of the first set of passages, if no filtration membrane is applied. Another way to clear the particles from the passage walls is to periodically apply a back pressure pulsation to the fluid separation module through the second set of passages during the filtration process to clear the particles from the membrane or passage walls of the first set of passages.

Figure 6:
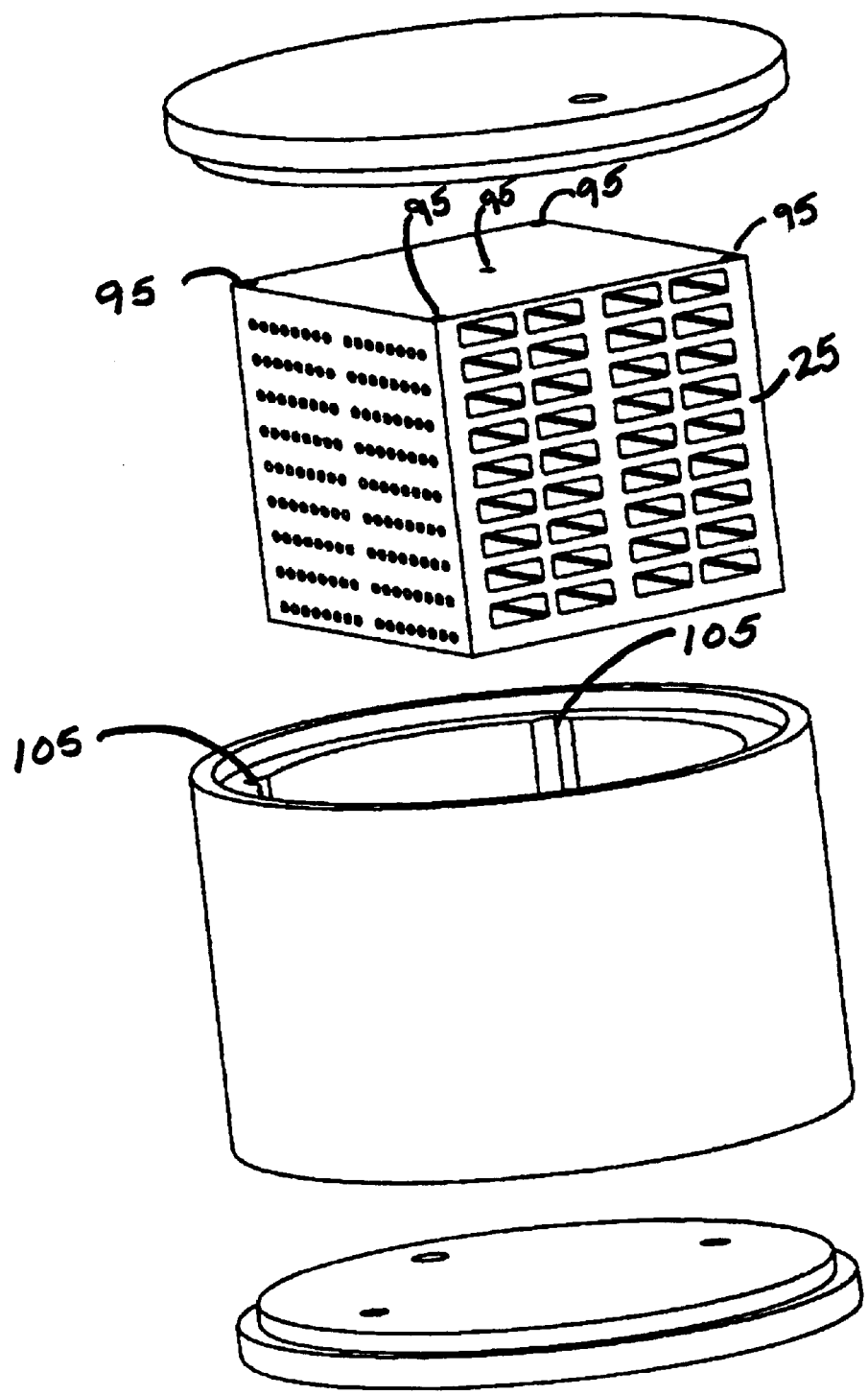
FIG. 6 is an exploded view of the fluid separation module having transducers affixed to the fluid separation module.
Figure 7:
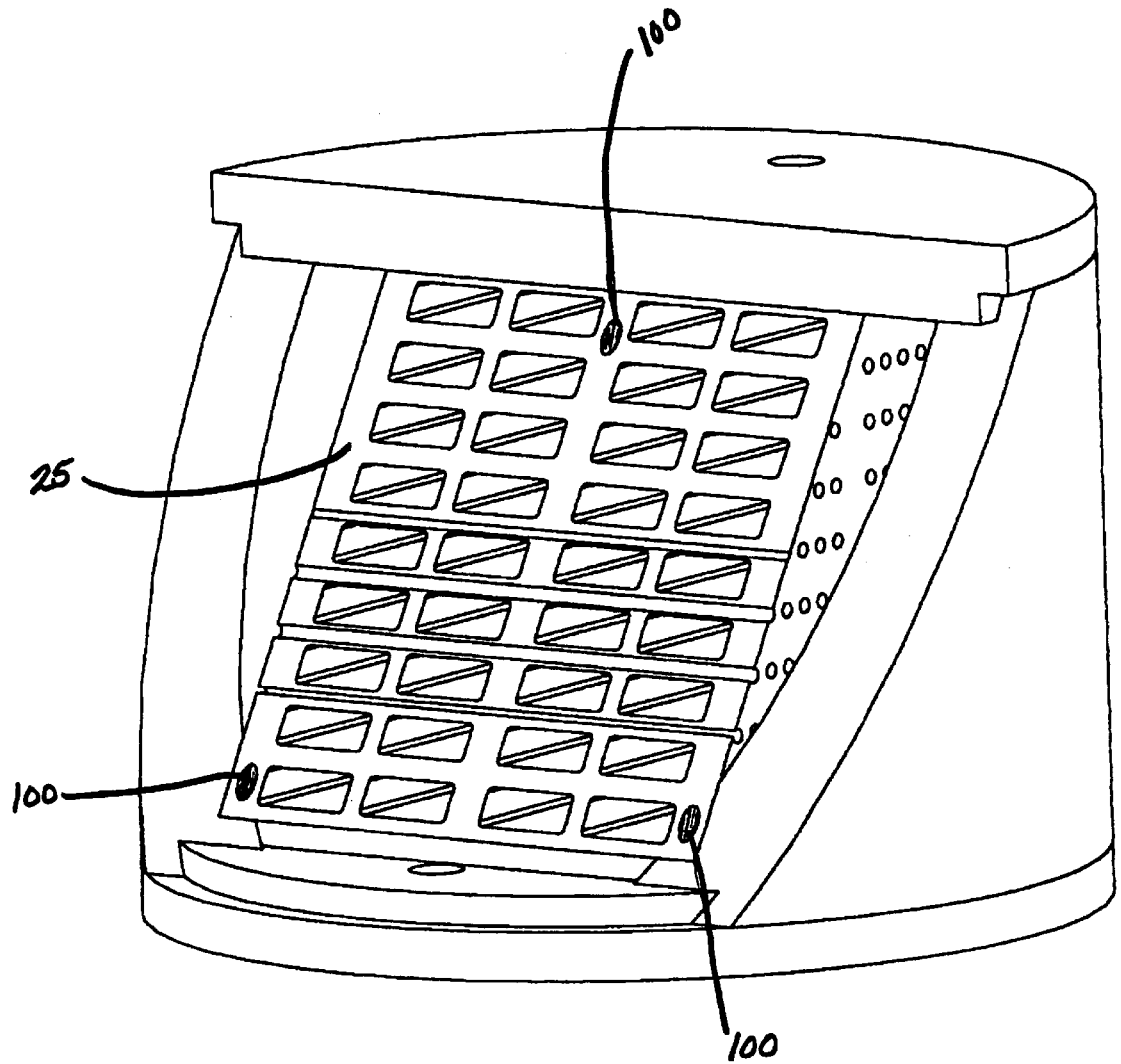
FIG. 7 is a cross-sectional view of the fluid separation module having transducers affixed to the fluid separation module.

FIGS. 6 and 7 show an alternative embodiment for removing any fouling from the passage walls or filter membrane by applying an ultrasonic vibration to the fluid separation module. Ultrasonic vibrations can be applied during filtration which allows for uninterrupted operation over a longer duration. Any ultrasonic vibration means known to those skilled in the art may be used wherein the excitation is either a single frequency or a frequency sweep to avoid deleterious standing waves and cavitation in the liquid. In particular, at least one transducer 95 is affixed or embedded at strategic locations in the monolithic core. The transducer 95 may be either a flat plate which is affixed to the monolithic core 25 such that it causes the fluid separation module to vibrate. The transducers may be of such an arrangement that there are rods 100 inserted into the monolithic core 25 and a transducer 95 is attached to each rod 100, causing the fluid separation module to vibrate through the rods 100. This latter arrangement is shown in FIG. 7. The rods 100 may be placed within either the first set of passages, the second set of passages or in a third specially made set of passages. The third set of passages may be equivalent to the holding channels 200. Enough room is left in the holding channels 105 to allow for vibrational movement of the fluid separation module. An example of one type of transducer used for this arrangement is a piezoelectric actuator which is affixed using a ceramic adhesive known to those skilled in the art.

EXAMPLES

EXAMPLE 1

A porous ceramic monolithic core was gel cast using the following process: 18.75 grams of Darvan 821A dispersant, commercially available from R. T. Vanderbilt was mixed with 98.30 grams of deionized water, 73.82 grams of N-(Hydroxymethyl)acrylamide (48 weight percent solution in water, Aldrich Chemical), and 5.32 grams Glycerin (High Valley Chemical) in a four liter high density polyethylene Nalgene™ carboy. 1000 grams of yttria-stabilized zirconia media (Tosoh Corporation) was added to the carboy. 500 grams of Ceralox APA-0.5 alumina (Condea Vista Co.) was added to the carboy and the carboy was mixed on a roller mill for approximately one hour. At this point, another 250 grams of Ceralox APA-0.5 was added to the carboy and returned to the roller mill for another hour of mixing to form a slurry. The slurry was then removed from the carboy, poured into a beaker, and subsequently placed in a bell jar where it was degassed for approximately five minutes. Once degassing was complete, 0.024 ml of tetramethyl-ethylenediamine was added to the slurry and stirred by hand for one minute. 0.24 ml of 10 weight percent ammonium persulfate solution in water was then added to the slurry and stirred by hand for one minute. The mixture was immediately poured into a mold containing rods placed in an orthogonal relationship with one another. The mold was placed into a drying oven around 75° C. for approximately 45 minutes to ensure complete solidification of the slurry. The rods were then removed to yield a ceramic monolith core having a first set of passages and a second set of passages. The ceramic monolith core was then bisqued at 600° C. to prevent cracking, and subsequently sintered around 1400° C. to yield a porous structure.

EXAMPLE 2

A fluid separation module is prepared from the porous ceramic monolithic core of Example 1. The second set of passages are blocked and the first set of passages of the porous ceramic monolithic core are spray or dip coated with a filtration membrane. The filtration membrane is allowed to dry and heated to appropriate temperature to obtain good adhesion with the monolithic core and also to control the pore size. The fluid separation module is placed within a housing having a feed inlet, a retentate outlet, and two permeate outlets.

EXAMPLE 3

The fluid separation module of Example 2 is used to separate a fluid having particles less than 0.1 microns dispersed throughout. A feed stream is introduced into the first set of passages through the feed inlet under high pressure. As the feed stream comes into contact with the filtration membrane, the particles remain within the feed stream and the fluid permeates through the membrane and porous ceramic core into the second set of passages. The permeate is recovered from the second set of passages at each end through the permeate outlets. The retentate, or the mixture of fluid and particles which did not permeate through the ceramic core are removed from the first set of passages through the retentate outlet.

EXAMPLE 4

A porous ceramic monolithic core having a first set of tapered passages and a second set of nontapered passages is gel cast using the following process: 18.75 grams of Darvan 821A dispersant, commercially available from R. T. Vanderbilt is mixed with 98.30 grams of deionized water, 73.82 grams of N-(Hydroxymethyl)acrylamide (48 weight percent solution in water, Aldrich Chemical), and 5.32 grams Glycerin (High Valley Chemical) in a four liter high density polyethylene Nalgene™ carboy. 1000 grams of yttria-stabilized zirconia media (Tosoh Corporation) is added to the carboy. 500 grams of Ceralox APA-0.5 alumina (Condea Vista Co.) is added to the carboy and the carboy is mixed on a roller mill for approximately one hour. At this point, another 250 grams of Ceralox APA-0.5 is added to the carboy and returned to the roller mill for another hour of mixing to form a slurry. The slurry is then removed from the carboy, poured into a beaker, and subsequently placed in a bell jar where it is degassed for approximately five minutes. Once degassing is complete, 0.024 ml of tetramethylethylenediamine is added to the slurry and stirred by hand for one minute. 0.24 ml of 10 weight percent ammonium persulfate solution in water is then added to the slurry and stirred by hand for one minute. The mixture is immediately poured into a mold containing one set of tapered rods and another set of nontapered rods placed in an orthogonal relationship with one another. The mold is placed into a drying oven around 75° C. for approximately 45 minutes to ensure complete solidification of the slurry. After the mixture sets, the mold and rods are removed to yield a porous ceramic monolithic core having a first set of tapered passages and a second set of nontapered passages. The ceramic monolith core is then bisqued at 600° C. to prevent cracking, and subsequently sintered around 1400° C. to yield a porous structure.

The second set of nontapered passages are blocked and a filtration membrane is disposed in the first set of tapered passages by dip coating or spray coating the passages with a filtration membrane. The filtration membrane is allowed to dry and heated to the appropriate temperature to obtain good adhesion with the monolithic core and also to control the pore size. The filtration membrane coated monolithic core serves as a fluid separation module.

The fluid separation module is placed within a housing having a fluid inlet, a retentate outlet and two opposing permeate outlets. Fluid containing particulate less than 0.1 microns is introduced into the first set of passages through the fluid inlet and under pressure. As the fluid passes through the first set of passages, the fluid is allowed to permeate through the filtration membrane into the second set of passages. Note that the particles are prevented from passing through the membrane. The permeate is recovered from the second set of passages through the permeate outlets. The fluid or retentate containing the remaining particles is removed from the first set of passages through the retentate outlet.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A fluid separation module comprising a porous monolithic core having a first set of open-ended passages wherein both ends are open-ended, extending from a feed end to a retentate end, wherein the first set of open-ended passages has a cross-sectional area, and a second set of open-ended passages wherein both ends are open-ended positioned in a non-parallel relationship to the first set of open-ended passages, for passage of a permeate therethrough.

2. A fluid separation module according to claim 1, wherein the monolithic core is comprised of a material selected from the group consisting of: ceramic, polymeric, paper and metal.

3. A fluid separation module according to claim 2, wherein the monolithic core is comprised of ceramic.

4. A fluid separation module according to claim 3, wherein the first set of passages are tapered from the feed end to the retentate end.

5. A fluid separation module according to claim 4, wherein the second set of passages has a smaller cross-sectional area than the first set of passages.

6. A fluid separation module according to claim 5, wherein the first set of passages is coated with a filtration membrane.

7. A fluid separation module according to claim 6, wherein the first set of passages and the second set of passages each has a geomatric shape selected from the group consisting of oval; round; and a polygon having at least 3 sides.

8. A fluid separation module according to claim 7, further comprising at least one transducer affixed to the monolithic core.

9. A fluid separation module according to claim 2, wherein the material has a pore size ranging from about 20 nanometers to about 40 microns.

10. A fluid separation module according to claim 1, wherein the first set of passages are tapered from the feed end to the retentate end.

11. A fluid separation module according to claim 10, wherein the second set of passages has a smaller cross-sectional area than the first set of passages.

12. A fluid separation module according to claim 11, wherein the set of passages is coated with a filtration membrane.

13. A fluid separation module according to claim 12, wherein the first set of passages and the second set of passages each has a geometric shape selected from the group consisting of: oval; round; and a polygon having at least 3 sides.

14. A fluid separation module according to claim 13, further comprising at least one transducer affixed to the monolithic core.

15. A fluid separation module according to claim 1, wherein the first set of passages has a smaller cross-sectional area than the first set of passages.

16. A fluid separation module according to claim 15, wherein the first set of passages is coated with a filtration membrane.

17. A fluid separation module according to claim 16, wherein the first set of passages and the second set of passages each has a geometric shape selected from the group consisting of: oval; round; and a polygon having at least 3 sides.

18. A fluid separation module according to claim 17, further comprising at least one transducer affixed to the monolithic core.

19. A fluid separation module according to claim 1, wherein the first set of passages is coated with a filtration membrane.

20. A fluid separation module according to claim 1, wherein the first set of passages and the second set of passages each has a geometric shape selected from the group consisting of: oval; round; and a polygon having at least 3 sides.

21. A fluid separation module according to claim 20, wherein the polygon having at least 3 sides is selected from the group consisting of: a triangle, a rectangle, a square, and a parallelogram.

22. A fluid separation module according to claim 21, wherein the polygon having at least 3 sides is a rectangle.

23. A fluid separation module according to claim 1, wherein the set of passages and the second set of passages each has a geometic shape selected from the group consisting of oval; round; and a polygon having at least 3 sides.

24. A fluid separation module according to claim 1, further comprising at least one transducer affixed to the monolithic core.

25. A fluid separation module comprising:

a porous ceramic monolithic core having a cube shape;

a first set of open-ended, rectangular, tapered passages wherein both ends are open-ended, disposed within the porous ceramic monolithic core, wherein the first set of open-ended, rectangular, tapered passages extends from a feed end to a retentate end, wherein the first set of open-ended, rectangular, tapered passages has a filtration membrane disposed therein and a cross-sectional area; and a second set of open-ended, rectangular passages wherein both ends are open-ended, disposed within the porous ceramic monolithic core wherein the second set of open-ended, rectangular passages is positioned in an orthogonal relationship to the first set of open-ended, retangular, tapered passages for passage of a permeate therethrough wherein the second set of open-ended, retangular passages has a smaller cross-sectional area than the cross-sectional area of the first set of open-ended, rectangular, tapered passages.

26. A fluid separation module comprising:

a porous ceramic monolithic core having a cube shape;

a first set of open-ended, rectangular, tapered passages wherein both ends are open-ended, disposed within the porous ceramic monolithic core, wherein the first set of open-ended, rectangular, tapered passages extends from a feed end to a retentate end, wherein the first set of open-ended, rectangular, tapered passages has a filtration membrane disposed therein and a cross-sectional area; and a second set of open-ended, rectangular passages wherein both ends are open-ended disposed within the porous ceramic monolithic core wherein the second set of open-ended, rectangular passages is positioned in an orthogonal relationship to the first set of open-ended, retangular, tapered passages, for passage of a permeate therethrough wherein the second set of open-ended, retangular passages has a smaller cross-sectional area than the cross-sectional area of the first set of open-ended, rectangular tapered passages; and at least one transducer affixed to the porous ceramic monolithic core.

27. A process for fluid separation, the process comprising the steps of:

a) providing a fluid separation module comprising a porous monolithic core having a first set of open-ended passages wherein both ends are open-ended, extending from a feed end to a retentate end wherein the first set of open-ended passages has a cross-sectional area; and a second set of open-ended passages wherein both ends are open-ended, positioned in a non-parallel relationship to the first set of open-ended passages for passage of a permeate therethrough;

b) introducing a feed stream into the feed end of the fluid separation module;

c) passing the feed stream through the first set of open-ended passages to separate the feed stream into a permeate and a retentate wherein the permeate is removed from the module through the second set of open-ended passages.

28. A process according to claim 27, wherein the monolithic core is comprised of a material selected from the group consisting of: ceramic, polymeric, paper and metal.

29. A process according to claim 28, wherein the monolithic cores is comprised of ceramic.

30. A process according to claim 28, wherein the material has a pore size ranging from about 20 nanometers to about 40 microns.

31. A process according to claim 27, wherein the first set of passages are tapered from the feed end to the retentate end.

32. A process according to claim 27, wherein the second set of passages has a smaller cross-sectional area than the first set of passages.

33. A process according to claim 27, wherein the first set of passages is coated with a filtration membrane.

34. A process according to claim 27, wherein the first set of passages and the second set of passages each has a geometric shape selected from the group consisting of: oval; round; and a polygon having at least 3 sides.

35. A process according to claim 34, wherein the polygon having at least 3 sides is selected from the group consisting of: a triangle, a rectangle, a square, and a parallelogram.

36. A process according to claim 35, wherein the polygon having at least 3 sides is a rectangle.

37. A process according to claim 27, wherein the monolithic core has a geometric shape selected from the group consisting of: a cube, a modified cube, and a cylinder.

38. A process according to claim 27, further comprising the step of applying an ultrasonic vibration to the fluid separation module.

39. A process according to claim 27, further comprising the step of applying a back pressure pulsation to the fluid separation module.

* * * * *